W. R. CHILDERS.
DRILLING TOOL JOINT.
APPLICATION FILED MAR. 2, 1917.
1,253,149.
Patented Jan. 8, 1918.
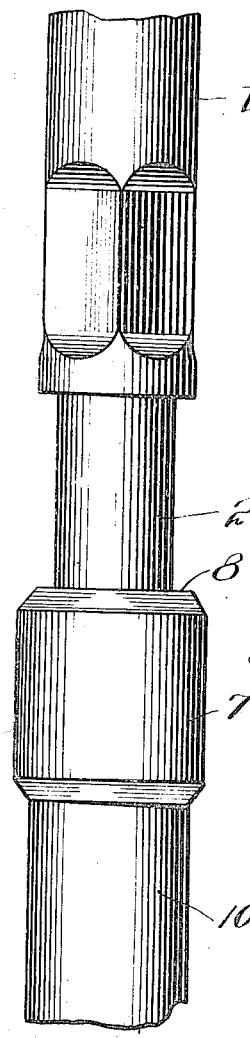
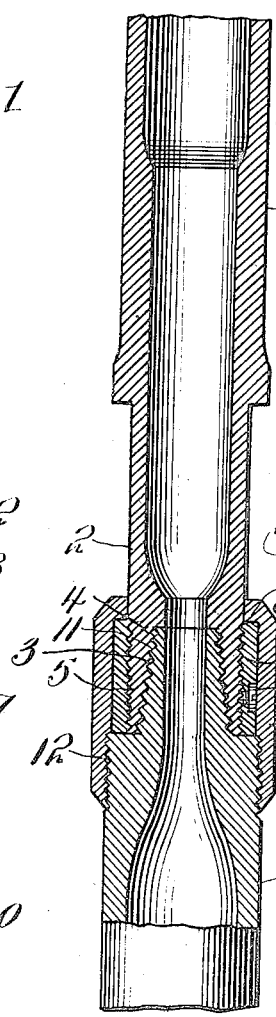
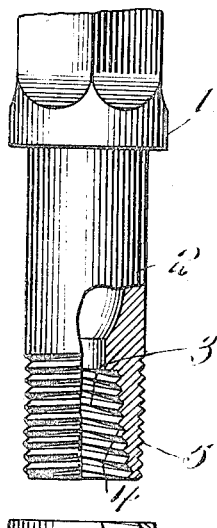
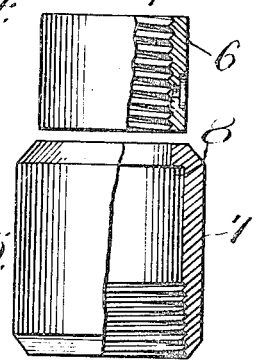
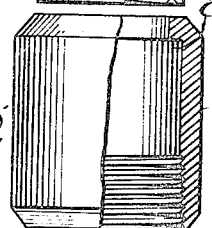
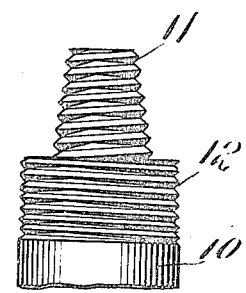
WITNESSES
J. L. Wright
D. B. Phillips
INVENTOR
William R. Childers
BY Victor J. Evans
ATTORNEY

UNITED STATES PATENT OFFICE.

WILLIAM R. CHILDERS, OF OILFIELDS, CALIFORNIA.

DRILLING-TOOL JOINT.

1,253,149.      Specification of Letters Patent.      Patented Jan. 8, 1918.

Application filed March 2, 1917. Serial No. 152,074.

*To all whom it may concern:*

Be it known that I, WILLIAM R. CHILDERS, a citizen of the United States, residing at Oilfields, in the county of Fresno and State of California, have invented new and useful Improvements in Drilling-Tool Joints, of which the following is a specification.

This invention relates to improvements in drill couplings, more especially to the form of coupling known as a drilling tool joint.

The primary object is to provide a safety joint for drilling tools which will furnish a reinforcement for such joint, preventing the usual difficulties arising from breakage of the drill joint, which sometimes render it impossible to withdraw the drill from the bore.

Another object is to simplify such a joint and thereby reduce the cost of construction.

A further object is to furnish a joint, all portions whereof may be pulled up tightly and securely.

With these and other objects in view, I have embodied my invention in the form shown in the accompanying drawings and described in the specification and claims hereto appended.

In the drawings,

Figure 1 is a side view of the joint.

Fig. 2 is a sectional side view of the same.

Figs. 3, 4, 5 and 6 illustrate various portions whereof the joint is composed.

Referring now to the drawings in detail, 1 represents a portion of a drill shaft having a reduced cylindrical extension 2 provided with a conical or frusto-conical bore 3 in the end thereof, said bore being interiorly formed with right hand screw threads 4, preferably of coarse pitch. A portion 5 of the periphery of the extension 2 is provided with screw threads, which portion may or may not extend beyond the inner extremity of bore 3. An annular collar 6 is provided with screw threads on the interior wall thereof adapted to engage the threads on extension 2 and has smooth exterior ends, said collar being equal in length to the screw threaded portion of extension 2 and greater in length than the screwthreaded bore 3, to compensate for weakening of the shaft caused by the bore. Inwardly extending through collar 6 are conveniently located set screws 9 which may be used to secure said collar in position, preventing accidental rotation thereof.

A sleeve 7, preferably constructed of a high grade of steel, is provided, having at one extremity an inwardly extending annular shoulder 8 adapted to slip over extension 2, but of a diameter small enough to prevent passage over collar 6. The interior wall of sleeve 7 adjacent with shoulder 8 is left smooth for a distance approximately equal to the length of collar 6 and is of a bore sufficiently great in diameter to readily slip over said collar. Extending from said smooth portion of the interior wall to the other extremity of sleeve 7 is a portion provided with left hand screw threads, preferably of a rather fine pitch, this portion also having a diameter permitting passage over collar 6. The exterior of sleeve 7 is smooth and provided with beveled or tapering extremities, thereby facilitating removal at the joint through a constricted opening or bore. A bit shaft 10 forming a portion of the joint is cylindrical in form, having a portion toward the extremity provided with left hand screw threads 12 adapted to engage the screw threads in the interior of sleeve 7, and terminates in a conical or frusto-conical extension 11, having right hand screw threads 4 adapted to engage with those in bore 3 in the end of extension 2.

From the above description of parts taken in connection with the drawings, the construction of the joint can be readily understood. It should be noticed that extension 2 is preferably of a length sufficient to leave a portion thereof projecting from the end of sleeve 7, when this sleeve is pushed on said extension until shoulder 8 engages the shoulder at the end of the extension. This permits the use of a suitable wrench on the collar 6 for removing or placing the same in position.

It will be found desirable in many instances to place sleeve 7 upon extension 2 and secure collar 6 on the screw threaded portion at the end of said extension at the time of manufacture. In this case, collar 6 will be preferably faced off, flush with the end of extension 2, after being placed in position, thereby securing a tighter joint. These parts form a unit capable of ready assembly with the bit shaft 10 at an oil field or similar locality where a complete equipment of tools may not be available.

The joint is assembled by pushing sleeve 7 back on extension 2 and inserting the extension 11 of drill shaft 10 in the conical bore 3, when a few turns of a wrench will secure this part of the joint. The sleeve 7 is now rotated in a direction to cause engagement with the left hand threads on the exterior of bit shaft 10 and similarly secured with a wrench.

It will be noted that this type of construction has important advantages over previous types wherein a shoulder corresponding to collar 6 is provided with screw threads on the exterior; and a sleeve corresponding to sleeve 7 has threads along the entire length, these threads consequently engaging both said shoulder and the bit shaft. Where such a construction is used, it is usually impossible to screw all the parts tightly together, as it rarely occurs in practice that threads on the shoulder corresponding to collar 6 will register correctly with those on the bit shaft when the extremity of the drill shaft is properly seated against the extremity of the bit shaft, thereby necessitating a slight unscrewing of the drill shaft before screwing the sleeve in position.

I wish it to be understood that the description and drawings above are not to be understood as in any way limiting the spirit or scope of my invention, as many and varied embodiments may be constructed without departing from the scope and the spirit of said invention.

What I claim is:

1. In a coupling, a shaft formed in the end with a bore; connecting means for said shaft, and means on said shaft adapted to be engaged by said connecting means to secure said shaft to a second shaft, said last mentioned means positioned on said first mentioned shaft exteriorly of said bore and having a length greater than said bore, and further adapted to strengthen said first mentioned shaft to compensate for said bore.

2. In a coupling, a shaft formed in the end with a bore, and formed upon the periphery exteriorly of the bore with screw threads, a collar on said shaft exteriorly of said bore, said collar formed with screw threads adapted to engage with the screw threads on said shaft, said collar having a length greater than the bore and adapted to strengthen said shaft to compensate for the bore, a sleeve loosely mounted on said shaft over said collar and having a shoulder at one end adapted to engage against the collar to secure the sleeve on the shaft, and having the other end projecting beyond the end of the shaft, said sleeve formed exteriorly of the last mentioned end with screw threads of opposite pitch to said screw threads wherewith the shaft and collar are formed.

In testimony whereof I affix my signature.

WILLIAM R. CHILDERS.